United States Patent [19]

Flam

[11] 3,847,139
[45] Nov. 12, 1974

[54] DEVICE FOR AID IN DETECTING BREAST CANCER

[76] Inventor: Eric Flam, 29 Ainsworth Ave., East Brunswick, N.J. 08816

[22] Filed: Apr. 13, 1973

[21] Appl. No.: 350,753

[52] U.S. Cl.................. 128/2 H, 128/156, 73/356, 350/160 LC
[51] Int. Cl............................................ A61b 10/00
[58] Field of Search............ 128/2 R, 2 H, 517, 156; 73/356; 350/160 LC; 252/408; 116/114.5; 324/51

[56] References Cited
UNITED STATES PATENTS

| 2,643,686 | 6/1953 | Richards | 139/421 |
| 2,945,305 | 7/1960 | Strickler | 73/356 X |
| 3,002,385 | 10/1961 | Wahl et al. | 73/356 |
| 3,421,513 | 1/1969 | Landau | 128/517 X |
| 3,465,754 | 9/1969 | Lockwood et al. | 128/510 X |
| 3,620,889 | 11/1971 | Baltzer | 350/160 LC |
| 3,661,142 | 5/1972 | Flam | 128/2 H |

OTHER PUBLICATIONS

Technology Concentrates, "Liquid Crystal Tape," Chemical & Engineering News, Oct. 25, 1971.

Primary Examiner—Aldrich F. Medbery
Attorney, Agent, or Firm—Samuelson & Jacob

[57] ABSTRACT

A device for aid in the visual detection of malignant tissue in the breasts, the device having a waist-like structure including a substrate of conformable material carrying a temperature-responsive coating viewable against the background of the substrate for displaying a visible pattern indicative of temperature variation along the breast surfaces to be examined when the structure is worn over the breasts with the substrate conformed to the contour of the surface being examined.

19 Claims, 6 Drawing Figures

DEVICE FOR AID IN DETECTING BREAST CANCER

The present invention relates generally to detection devices and pertains, more specifically, to a relatively simple and inexpensive device for aid in the early detection of malignant tissue in the breasts.

One of the most dreaded and devastating afflictions faced by women today is breast cancer. It is the most common type of fatal cancer in women. Early detection and appropriate treatment have long been recognized as an effective approach to combating the affliction. Earlier detection of malignant tissue would be even more effective.

There are, at present, several techniques for the detection of breast cancer in women; namely, physical examination, mammography, xerography, and thermography.

Physical examination ordinarily is carried out by a physician or by the woman herself. The examiner probes for lumps or masses in the tissue being examined. The method is fairly accurate; however, in a large number of cases cancers large enough to be detected by this method have already spread to other areas, thus reducing the chances of survival.

Mammography is a reliable means of detecting breast cancer prior to the appearance of physical signs and symptoms. The technique involves an X-ray examination which is time consuming and which requires technicians and radiologists with special training, thus rendering the procedure expensive.

Xerography is similar to mammography with the exception that X-rays are made on xerographic plates rather than on photographic film. Again, the procedure and analysis is time consuming and expensive, requiring specially trained technicians and radiologists.

Thermography has been used widely in medical diagnosis and special devices have been developed which can scan a surface area to produce a thermogram containing information pertaining to temperature variations over the scanned area. A localized elevation of temperature can indicate the presence of a cancer; however, such "hot spots" can be the result of other causes and additional investigation is required to determine the actual cause. The technique requires exceptionally expensive equipment and trained technicians.

Each of the above methods has shortcomings. For example, a physical examination detects breast cancer only when it becomes large enough to be palpated. Mammography, which requires X-ray techniques, poses the danger of excessive radiation exposure should tests be repeated too often. Xerography also employs X-rays. Thermography can detect, but not necessarily localize malignant tissue. All of the techniques result in a certain percentage of false positive as well as false negative indications.

Of all of the above techniques, thermography is attractive from the standpoint of ease, reliability, the absence of radiation problems, and early detection capabilities. However, the method still requires exceptionally expensive equipment and highly trained personnel. Thus, none of the above methods lends itself to a quick, convenient examination and one which can be made by the woman herself in her own home, with the possible exception of palpation. However, when malignancies become palpable, breast cancer may already be advanced.

It has been suggested that localized elevated temperatures on the surface of the breasts can be detected visually through observing a temperature-responsive indicator, such as a phosphor or liquid crystals, applied directly to the skin in the form of a coating. Where the indicator is a liquid crystal system, such methods usually require that a dark background of material also be applied to the skin so that changes in the liquid crystals, due to temperature variations, can be observed. Some disadvantages of these methods are that they require the rather inconvenient and uncomfortable step of coating the breasts with necessary materials and then removing the materials from the skin, that such a coating may not be uniform and can therefore lead to false indications, and that coatings applied in consecutive examinations of a particular patient may vary and thus reduce the value of observing a trend from examination to examination.

It is therefore an object of the invention to provide a device which aids in early detection of the presence of malignant tissue in the breasts.

Another object of the invention is to provide such a device which is so convenient to use and so relatively inexpensive as to encourage its use by women in their own homes, as well as by physicians.

Still another object of the invention is to provide a device of the type described which is reliable and which may be used many times over so as to facilitate and encourage early detection of breast cancer.

A further object of the invention is to provide a device which can be used without discomfort and without the use of elaborate equipment or highly trained technicians.

A still further object of the invention is to provide a device which will produce consistent results from examination to examination so that changes in the observed information reliably will yield indications of the presence of abnormalities, including malignant tissue.

The above objects, as well as still further objects and advantages, are attained by the invention which may be described briefly as a device for aid in the detection of malignant tissue in the breast of a woman, the device comprising a body contoured garment structure including a substrate of stretchable conformable material having an obverse surface which can be viewed when the device is worn over the breast and a reverse surface which conforms essentially to the contour of the breast to contact the breast essentially over the breast surface to be examined by virtue of the stretchable conformable nature of the material, means for affixing the substrate over the breast surfaces to be examined and a temperature-responsive coating portions of the obverse surface of the surface constituting a means for enabling the substrate to maintain a stretchable conformable nature while permitting the substrate to remain coated, the stretchable conformable material being sufficiently thin to enable the transfer of heat from the breast surface to the coating.

The invention will be more fully understood, while still further objects and advantages thereof will become apparent, in the following detailed description of preferred embodiments of the invention illustrated in the accompanying drawing, in which.

Figure 1:
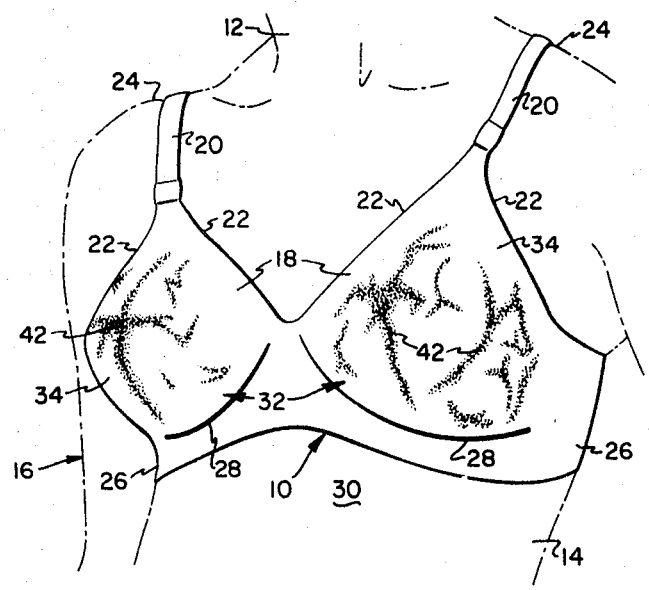
FIG. 1 is a perspective view illustrating a device constructed in accordance with the invention in use upon a woman.
Figure 2:
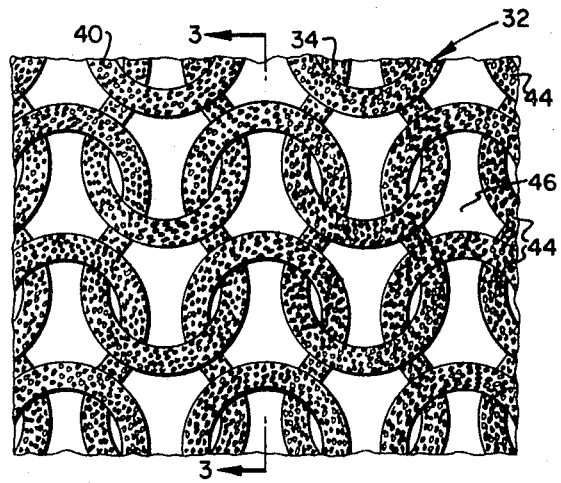
FIG. 2 is an enlarged fragmentary view of the obverse surface of the device.
Figure 3:
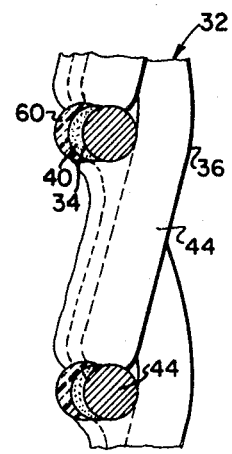
FIG. 3 is a cross-sectional view taken along line 3—3 of FIG. 2.

Referring now to the drawing, and especially to FIGS. 1 through 3 thereof, a device constructed in accordance with the invention is illustrated generally at 10. Device 10 is constructed in a form which resembles a waist-like garment in that it is designed to be worn between the neck 12 and the waist 14 of a woman 16. The overall structure of device 10 includes cup portions 18 and means for affixing the cup portions over the surfaces of the breasts to be examined. These means are illustrated in the form of upper straps 20 extending from the upper edges 22 of the cup portions 18 to pass over the shoulders 24 of the woman 16, and lower straps 26 extending from the lower edges 28 of the cup portions 18 for passing around the torso 30 of the woman 16 to interconnect with the upper straps 20 in any one of a number of conventional arrangements.

The cup portions 18 include a substrate 32 of conformable material having an obverse surface 34 and a reverse surface 36. When the device 10 is worn by a woman, as illustrated in FIG. 1, the obverse surface 34 may be viewed by an examining physician or by the woman herself while the reverse surface 36 contacts the breast surfaces to be examined. The conformable nature of the material of the substrate 32 enables the material, and the reverse surface 36 thereof, to conform essentially to the contour of the breasts so that intimate contact is made between reverse surface 36 and the breast surfaces to be examined.

In order to obtain the desired conformability, materials which extend and are compliant are chosen for the substrate 32. Such materials include both textiles and elastomers, latex being an example of an elastomeric material which may be used for the substrate. Textiles of nylon, polyester, the combination of nylon or polyester with Spandex and cellulosic materials are among those fabrics suitable for substrate 32. Devices have been prepared using substrate materials which were knitted from nylon and nylon-Spandex yarns. Examples of these materials include knitted fabrics prepared from commercially available yarns known as Enkalure and Banlon (nylon) and Milliskin (nylon-Spandex). Such knitted fabrics provide excellent stretch and conformability characteristics. Other suitable materials will be apparent to those skilled in the art of materials. For example, a substrate of polyurethane foam, preferably of the compressed type, is feasible.

The obverse surface 34 carries a temperature-responsive coating 40 upon the obverse surface. Preferably, coating 40 of device 10 is a liquid crystal system comprised of "cholesteric" liquid crystals which are described fully in my earlier U.S. Pat. No. 3,661,142. In general, liquid crystals reflect components of visible incident light, the specific wave lengths (red, yellow, green and blue) being a function of temperature. Usually, the colors displayed by a liquid crystal system over its active range follow the sequence black to red to yellow to green to blue to black as a function of increasing temperature. The liquid crystal system coating 40 falls into such a pattern.

Upon placing the device 10 upon the woman 16, as illustrated in FIG. 1, temperature variations over the breast surfaces being examined will be transferred to the liquid crystal system and will result in a thermal pattern 42 of color variation which can be observed by an examining physician or by the woman herself and which may be photographed. Because liquid crystals reflect components of incident light, it is necessary, for maximum visibility of the pattern 42, that all other wave lengths of incident light be absorbed. Ideally, the only components of light which should be observed in the thermal patterns produced with the device are those reflected by the liquid crystal system itself. All other light should be absorbed. Thus, the substrate 32 is made black or at least very dark so as to absorb incident light.

The material of the substrate 32 must be of the proper thickness; that is, the material of the substrate must not be too sheer nor too heavy. If the material is too sheer, or highly porous, the underlying skin of the patient will show through, thus allowing light reflected from the skin to mix with that reflected from the liquid crystal system, thereby interfering with or obscuring the thermal pattern produced by the liquid crystal system. On the other hand, materials which are too thick may interfere with the transmission of heat from the underlying skin to the liquid crystal system on the obverse surface 34. For example, materials which are less desirable because they are either too thin or too thick are sheer hosiery on the thin side and thermal underwear on the thick side. Materials which are currently in use for the manufacture of certain brassieres have been found suitable for device 10. For example, stretch brassieres such as the "Watch Me" brassiere, No. 66318, manufactured by Maiden Form and the "Chicas" brassiere, style No. 220, manufactured by Formaid employ both configurations and materials suitable for use as a substrate 32 for device 10.

In order to attain ease of manufacture, durability, and stability from the liquid crystal system coating 40, it is preferable to employ encapsulated liquid crystals (ELC). For the maximum display of color in a coating of ELC, the coating is preferably applied in amounts within the range of about 2.5 to about 4 ounces per square yard of substrate material. Applications much thinner than the specified amounts have been found to not reflect the desirable amount of light, and clear thermal patterns may be difficult to observe. Applications much greater than the specified range will not yield more reflected light. Such a heavier coating would make the device more expensive and could lead to a coating with poor mechanical properties; that is, an excessively thick coating can chip or craze more readily than a thinner coating. In addition, especially with encapsulated liquid crystals, an excessively thick coating can lead to diminished visibility in that the encapsulating materials are generally light in color and an excessive amount of light-colored material can act as a reflecting surface which will interfere with the thermal patterns produced by the liquid crystals themselves.

Coating 40 is readily applied to substrate 32 by spraying.

Returning briefly to the question of thickness and porosity of the substrate material, an excessively sheer or porous material places a limitation upon the amount of liquid crystal material which can be applied to the substrate, since, as illustrated in FIGS. 2 and 3, the coating 40 which carries the liquid crystal system is preferably carried only by the exposed fabric strands 44 and should not bridge the gaps 46 between these strands 44. A bridging of the gaps 46 between strands 44 by the coating 40 could affect the conformability and stretching properties of the substrate 32, as well as the ability of the coating 40 to adhere to the strands 44 of the substrate 32.

In utilizing device 10 for detection purposes, the woman 16 will put on the device as illustrated in FIG. 1. Within a few seconds a thermal pattern 42 will develop. It has been observed that the pattern 42 is relatively insensitive to ambient temperatures and will give consistent results throughout a range of ambient temperatures which can be characterized as room temperature. Should the pattern 42 reveal any excessively high temperature areas, or other anomalous patterns, further examination by a physician would be indicated. The pattern 42 can be photographed and the photograph preserved as a permanent record. Thus, at a later date the woman can put on the device 10 once more and observe the thermal pattern by standing before a mirror. She could then compare the current thermal pattern with the earlier thermal pattern in the photograph. If a deviation is noted between the photograph and her current pattern, it would indicate to the woman that she should see a physician for another examination. Such changes in thermal patterns are often the earliest sign of some abnormality. These changes often occur well before there is any palpable lump in the breast. At such a stage in time, the best protection against breast cancer is early detection, so that treatment or surgery can be most effective.

The range of skin temperature at the breast region is from about 85° to 95°F. One approach for accommodating the entire range with device 10 is through the use of a single liquid crystal system with a wide temperature range (e.g., W-630 ELC material made by National Cash Register Company). However, wide temperature range is obtained at the expense of sensitivity to temperature differences within the range. Sensitivity is of importance in showing localized temperature variations of, for example, 0.5° to 1°F. Such variations are significant in detecting early changes in an individual's thermal patterns; thus, it would be very desirable to detect such small changes.

Figure 4:
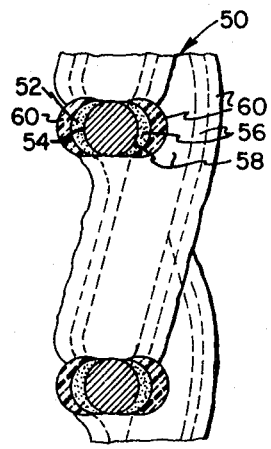
FIG. 4 is a cross-sectional view, similar to FIG. 3, illustrating another embodiment of the invention.

Generally, the narrower the operating range of a liquid crystal system the more sensitive the system will be to small changes in temperature. In order to increase the available sensitivity, another embodiment of the invention, similar to the device of FIGS. 1 through 3, is provided and is shown in FIG. 4 as having a substrate 50 which is the same as that of device 10, but which carries a pair of liquid crystal systems, one liquid crystal system being carried in coating 52 on the surface 54 of the substrate 50 while the other liquid crystal system is carried on coating 56 upon the other surface 58 of the substrate 50. Each liquid crystal system on substrate 50 need operate only over a five degree range, rather than the full ten degree range of the single liquid crystal system employed in device 10. Thus, the first liquid crystal system coating 52 will cover the range of 85° to 90°F while the second liquid crystal system coating 56 will cover the 90° to 95°F range, with perhaps some overlap between the two ranges. Other ranges are feasible.

In using the device of FIG. 4, the woman would put on the device in such a way that the lower temperature range coating 52 would be on the outside so that the thermal pattern developed in the lower temperature range coating 52 could be observed. Should the woman observe a clearly discernible pattern, a record of the pattern can be made. At a later time, when the woman again puts on the device with the low temperature range coating 52 in view, she may notice that the thermal pattern does not quite correspond to the originally observed pattern, that is, some of the thermal pattern components may have shifted from the green to the blue-black regions of the spectra of the ELC material. The woman can then reverse the device and place the higher temperature range coating 56 in view to enable a more accurate reading of the shifted components of the pattern in the yellow-green range on the higher temperature range coating 56. Although such changes may represent only a one degree change in the temperature within the limited areas noted, such a change may be significant enough for the woman to see her physician.

In order to protect the ELC coatings 40, 52 and 56 from surface contamination, especially in the embodiment of FIG. 4, a covering 60 of clear material, such as a lacquer or plastic, may be applied over the ELC coating. Again, the clear covering 60 is applied only over the ELC coated strands 44 and not in the gaps 46 between the strands. In this manner, conformability of the substrate is preserved. Since only a thin covering 60 is necessary, the thermal response of the liquid crystal systems is not degraded. Covering 60 may be applied by spraying.

Figure 5:
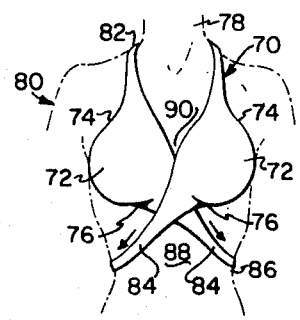
FIG. 5 is a front view of still another device constructed in accordance with the invention in place upon a woman.
Figure 6:
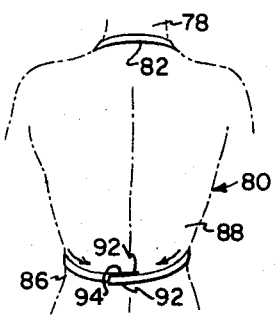
FIG. 6 is a rear view showing the back of the woman in FIG. 5.

Referring now to the embodiment illustrated in FIGS. 5 and 6, the overall configuration of a device constructed in accordance with the invention may be varied to accommodate various breast sizes and configurations. Thus, for breasts of average size, configuration and placement, the embodiments of FIGS. 1 through 4 are adequate to accommodate the breast area to be examined. However, for larger breasts and for breasts which are placed in close proximity to one another so that the cleft between the breasts is pronounced, the configuration illustrated in FIGS. 5 and 6 may be employed to obtain good results. Thus, device 70, which is another device constructed in accordance with the invention, also has a waist-like structure which includes an individual cup portion 72 for each breast, each cup portion 72 having an upper edge 74 and a lower edge 76. First strap means are provided for extending around the neck 78 of the woman 80, and are illustrated as a first strap 82 interconnecting corresponding upper edges 74 of each cup portion 72. Second strap means are illustrated in the form of second straps 84 interconnecting corresponding lower edges 76 of each cup portion 72 and are adapted to extend around the waist 86 of the woman 80. The second straps 84 extend diagonally across the torso 88 of the woman so that the straps 84 cross over one another adjacent the inner periphery of each breast; that is, adjacent the cleft 90 between the breasts. By drawing the second straps 84 tightly around the torso 88 in the directions indicated in FIGS. 5 and 6, the cup portions 72 will be made to conform closely to the breasts, particularly in the region of the cleft 90, so that the entire breast region is covered and can be viewed simultaneously. The free ends 92 of the second straps 84 include means for selectively changing the effective length of the straps 84 to provide for variations in breast size and contour, these means being illustrated in the form of a Velcro connection at 94. Alternately, the first strap 82 may be divided into two separate straps, criss-crossed in the region of the cleft 90 and joined by selectively changeable means similar to the connection at 94, in order to attain the desired conformance to the contour of the breasts in the region of the cleft. While either device 10 or device 70 can be adapted for use in the examination of only one breast, where the woman has already undergone a mastectomy, by the elimination of one cup portion, device 70 is somewhat better suited to such use in that greater conformability can be attained by the particular criss-crossed arrangement of straps in device 70.

It will be apparent that the devices described above cover all areas of the breast region at the same time and that a complete thermal pattern can be obtained at one time without moving the device from one location to another. The device requires only seconds to indicate a thermal pattern once the device is in place and putting on or taking off the device is equivalent to putting on or taking off a brassiere, requiring little time and no special procedures. Room temperature is not a critical factor and the requirement for close control of room temperature is reduced. The conformable nature of the substrate employed in the above devices not only enables accurate patterns to be developed, but reduces the number of sizes required in the devices so that manufacture of these devices is more economical. In addition, should the breast region of an individual woman change with time, or undergo periodic changes, the substrate can conform to the changes. Thus, any false indications which might occur by virtue of the appearance of gaps between the skin and the device are reduced to a minimum.

It is to be understood that the above detailed description of embodiments of the invention are provided by way of example only. Various details of design and construction may be modified without departing from the true spirit and scope of the invention as set forth in the appended claims.

The embodiments of the invention in which an exclusive property or privilege is claimed are defined as follows:

1. A device for aid in the visual detection of malignant tissue in the breast of a woman, said device comprising:

a body contoured garment structure including a substrate of stretchable conformable material having an obverse surface which can be viewed when the device is worn over the breast and a reverse surface which conforms essentially to the contour of the breast to contact the breast essentially over the breast surfaces to be examined by virtue of the stretchable conformable nature of the material;

means for affixing the substrate over the breast surfaces to be examined; and a temperature-responsive coating on portions of the obverse surface of the substrate constituting a means for enabling the substrate to maintain a stretchable conformable nature while permitting the substrate to remain coated;

said stretchable conformable material being sufficiently thin to enable the transfer of heat from said breast surfaces to the coating.

2. The invention of claim 1 wherein the coating includes a temperature-responsive liquid crystal system and said material of the substrate is sufficiently thick to provide a suitable background for viewing a thermal pattern developed in the liquid crystal system.

3. The invention of claim 2 wherein the obverse surface of the substrate has a minimal light-reflective characteristic.

4. The invention of claim 2 wherein the liquid crystal system comprises encapsulated liquid crystals coated upon the substrate.

5. The invention of claim 4 wherein the encapsulated liquid crystals are coated in the amount of about 2.5 to about 4 ounces per square yard of substrate material.

6. The invention of claim 1 wherein the substrate is a fabric knitted from strands of resilient material, said fabric including gaps between the strands.

7. The invention of claim 6 wherein the coating includes a temperature-responsive liquid crystal system and the conformable material of the substrate is sufficiently thick to provide a suitable background for viewing a thermal pattern developed in the liquid crystal system.

8. The invention of claim 7 wherein the portions of the substrate upon which the liquid crystal system is coated are the strands of the fabric without bridging the gaps.

9. The invention of claim 1 including a second temperature-responsive coating on the reverse surface of the substrate, said second temperature-responsive coating being responsive to a range of temperatures different from the range of temperatures to which the first said temperature-responsive coating is responsive.

10. The invention of claim 9 wherein each coating includes a temperature-responsive liquid crystal system and the conformable material of the substrate is sufficiently thick to provide a suitable background for viewing a thermal pattern developed in the liquid crystal system of the viewed coating.

11. The invention of claim 10 wherein the obverse surface and the reverse surface of the substrate have a minimal light-reflective characteristic.

12. The invention of claim 10 wherein the liquid crystal systems comprise encapsulated liquid crystals coated upon the substrate.

13. The invention of claim 12 wherein the encapsulated liquid crystals are coated in the amount of about 2.5 to about 4 ounces per square yard of substrate material.

14. The invention of claim 9 wherein the substrate is a fabric knitted from strands of resilient material, said fabric including gaps between the strands.

15. The invention of claim 14 wherein the liquid crystal systems are coated upon the strands of the fabric without bridging the gaps.

16. The invention of claim 1 wherein the said contoured garment structure includes:

an individual cup portion for a breast, the cup portion having an upper edge and a lower edge;

first strap means extending from the upper edge of the cup portion for extending around the neck of the woman;

second strap means extending from the lower edge of the cup portion for extending around the waist of the woman;

with one of said first and second strap means crossing over itself adjacent the inner periphery of the breast so as to extend diagonally relative to the woman for conforming the cup portion closely to the breast, especially in the region of the inner periphery thereof.

17. The invention of claim 16 wherein the coating includes a temperature-responsive liquid crystal system and the conformable material of the substrate is sufficiently thick to provide a suitable background for viewing a thermal pattern developed in the liquid crystal system.

18. The invention of claim 17 including:

an individual cup portion for each breast, each cup portion having an upper edge and a lower edge;

said first strap means interconnecting corresponding upper edges of the cup portions for extending around the neck of the woman; and said second strap means interconnecting corresponding lower edges of the cup portions for extending around the waist of the woman;

with one of said first and second strap means crossing over itself adjacent the cleft between the breasts so as to extend diagonally relative to each breast for conforming the cup portions closely to the breasts in the region of the cleft.

19. The invention of claim 18 including means for selectively changing the length of one of said first and second means to provide for variations in breast size, contour and placement.

* * * * *